ly mounted.

United States Patent [19]

Ezban

[11] 4,365,730
[45] Dec. 28, 1982

[54] DYNAMIC PRESSURE RELIEF DEVICE FOR STORAGE ELEVATION

[76] Inventor: Morris J. Ezban, 57-10 Junction Blvd., Elmhurst, N.Y. 11373

[21] Appl. No.: 811,374

[22] Filed: Jun. 29, 1977

Related U.S. Application Data

[63] Continuation-in-part of Ser. No. 649,530, Jan. 15, 1976, abandoned.

[51] Int. Cl.³ .............................................. B65D 83/06
[52] U.S. Cl. ..................................... 222/547; 193/12; 414/299
[58] Field of Search ............... 222/459, 547, 564, 413, 222/548, 240, 241, 63; 193/12, 13; 214/17 R, 17 A, 17 C; 414/288, 299, 302, 310–312

[56] References Cited

U.S. PATENT DOCUMENTS

| 808,856 | 1/1906 | Melton | 222/240 X |
| 1,928,459 | 9/1933 | Pardee | 214/17 R X |
| 3,055,550 | 9/1962 | Smith et al. | 222/63 X |
| 3,278,054 | 10/1966 | Stott | 193/12 X |
| 3,782,642 | 1/1974 | Trafford | 222/240 X |
| 3,940,037 | 2/1976 | Watson | 222/564 |

FOREIGN PATENT DOCUMENTS

| 6412 | 3/1904 | Denmark | 222/459 |
| 244343 | 3/1912 | Fed. Rep. of Germany | 222/413 |

Primary Examiner—F. J. Bartuska
Attorney, Agent, or Firm—Arthur T. Fattibene

[57] ABSTRACT

A pressure relief device for use in a storage elevator for reducing the dynamic pressure imposed on the walls of a storage elevator during a discharging operation which includes a screw which extends longitudinally along the interior of the storage elevator and in spaced relationship to the vertically extending side walls of the elevator. The screw may be fixed or rotatably mounted.

6 Claims, 5 Drawing Figures

DYNAMIC PRESSURE RELIEF DEVICE FOR STORAGE ELEVATION

RELATED APPLICATIONS

This application is a continuation-in-part application of my application Ser. No. 649,530 filed Jan. 15, 1976 for Pressure Relief Device now abandoned.

PROBLEM AND PRIOR ART

Storage elevators and silos, e.g., for grain and various other granular like materials, comprise relatively large structures, frequently having diameters of ten, twenty or more feet and often being a hundred or more feet high. As a result when such grain or storage elevators are filled, the contents thereof exert a considerable lateral pressure on the walls of such elevators. Generally, the lateral pressure exerted on the walls of the elevator is a static pressure. However, when the discharge opening of the elevator is opened, and the material therein begins to flow during a discharging operation, it has been observed that the lateral pressures exerted on the walls of the elevator are substantially increased. The considerable increase in lateral pressure on the walls of the elevator has been attributed to the dynamic pressure of the material flow during a discharging operation. Such dynamic pressure increase was greatest in the upper and intermediate areas of the storage elevator and which decreases only toward the bottom of the elevator.

Heretofore, to compensate for such increase in pressure acting on the walls of a storage elevator or silo, the walls of the silo were reinforced in order to withstand such pressure. However, because of the considerable size of such silo or storage elevator, the cost of reinforcing such walls presented considerable design problems and initial high costs. Unless the walls of such elevators were properly designed to withstand the increased dynamic pressure imparted on such walls, the upper walls of the elevator would tend to fail within a given limited time frame, then would otherwise occur, if not for the dynamic pressure action thereon.

OBJECTS

It is therefore an object of this invention to provide a storage elevator or silo with a pressure relief device which will substantially minimize the dynamic pressure build-up on the walls of the elevator during a discharging operation.

Another object is to provide a pressure relief device which by relieving the dynamic pressure acting on the walls of the elevator, the flow of material through the discharge opening is enhanced during a material discharging operation.

Another object is to provide a pressure relief device for a storage elevator which is relatively simple and positive in operation.

BRIEF SUMMARY OF THE INVENTION

The foregoing objects and other features and advantages are obtained by a storage elevator or silo, e.g., a grain elevator having longitudinally disposed therein a pressure relief device in the form of a screw which has a blade diameter which is relatively small in comparison to the cross-sectional diameter of the storage elevator. The screw is vertically disposed and of rigid construction, whereby the pitch, diameter and blade shape may be of uniform or variable in configuration along the longitudinal axis of the screw. The screw could be extended for the entire length of the storage elevator or for a portion of the elevator height. Also, the screw may be fixed or may be rotatably mounted within the elevator or silo.

FEATURES

A feature of this invention resides in the provision of an elongated screw disposed within the storage elevator in spaced relationship to the circumscribing walls of the elevator which functions to minimize the lateral build-up of pressure on the walls of the elevator during a discharging operation.

Another feature resides in the provision whereby the screw can be either fixed or mounted for rotation within the storage elevator.

Another feature resides in the provision whereby the screw further facilitates the discharge of the material from the elevator.

Another feature resides in the provision whereby the incorporation of the screw pressure relief device results in the provision that the walls reinforcements heretofore required to withstand the increase lateral forces resulting from the dynamic pressures can be minimized.

Other features will become more readily apparent when considered in view of the drawings and specification wherein.

DETAILED DESCRIPTION

Figure 1:
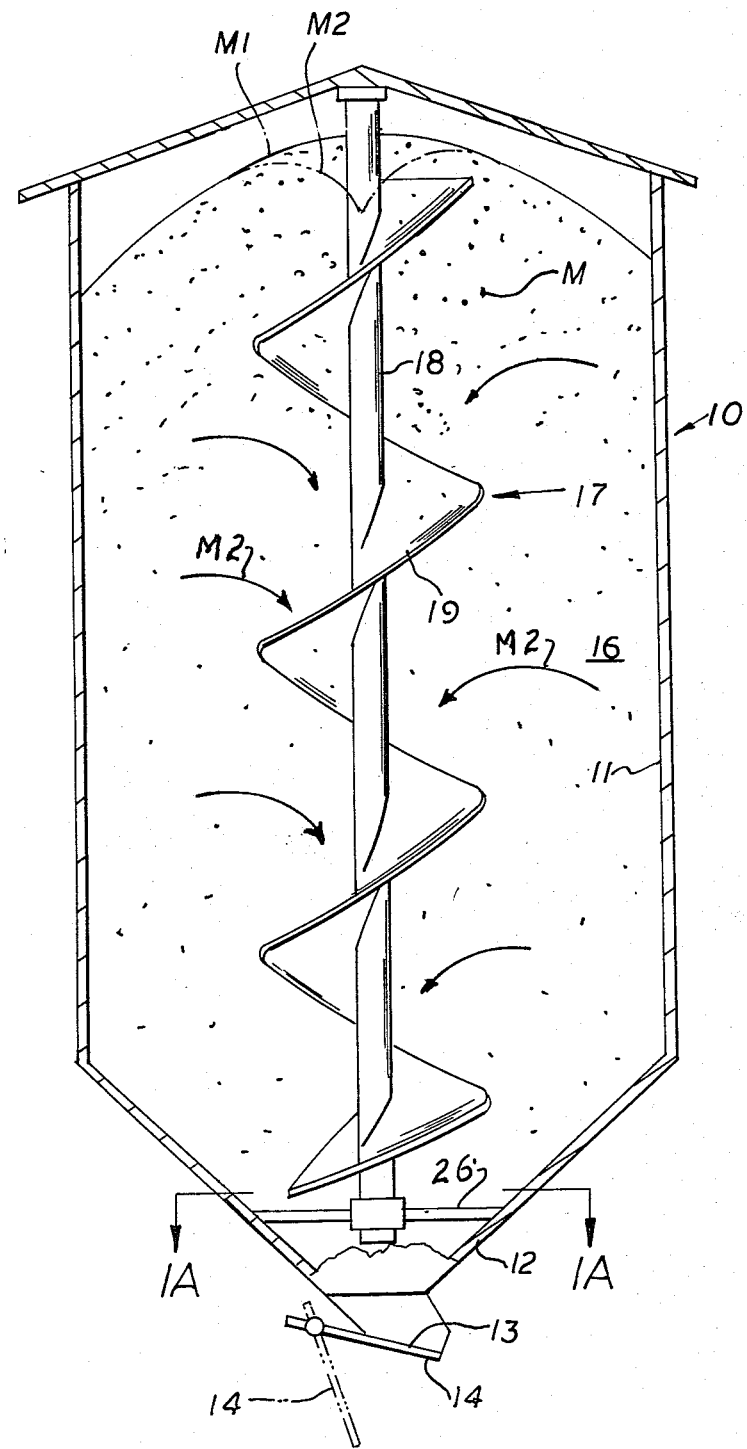
FIG. 1 illustrates a cross-section view of a storage elevator or silo embodying the present invention.

Referring to the drawings there is shown in FIG. 1 a storage elevator or silo 10 embodying the present invention. It comprises a building structure having a diameter which may be as large as ten, twenty or more feet, and having a height of fifty, sixty or more feet. Frequently, the height of such storage elevators may exceed one hundred or more feet. Such elevators generally have upwardly extending circumscribing side walls 11 which converge into a hopper like section 12 adjacent the bottom end of the elevator 10. The hopper section 12 generally terminates at a discharge opening 13 which is suitably controlled by a closure 14. The dotted line showing illustrates the closure in the opened position.

In accordance with this invention there is disposed within the bin portion 16 of the elevator a pressure relief device 17. The pressure relief device 17 comprises an elongated central axle 18 to which there is connected a helical screw blade 19. The diameter of the screw blade 19 is substantially smaller than the cross-section or diameter of the bin portion 16. In the embodiment of FIG. 1, the axle or axis 18 of the pressure relief device is rigidly fixed. Thus the screw is not free to turn. It will be understood that the pitch, diameter and shape of the blade portion 19 may vary depending upon the nature or properties of the stored material, the dimensions of the elevator, the magnitude of the lateral pressures and the required discharge rate. In the illustrated embodiment, the axis of the pressure relief device is disposed in alignment with the discharge opening 13. As shown, the axle 18 is fixed between an upper and lower supports; the lower support being secured by a brace or spider 26.

In operation, with the elevator 10 filled with granular material, e.g., grain, and with the opening 13 closed, the weight of the grain exerts a lateral static pressure on the walls 11 of the elevator.

Referring to FIG. 1, the solid line showing $M_1$ illustrates the lay of the material M when the opening 13 is normally closed. Upon the opening of the discharge opening, the central movement of the material, which tends to follow the curvature of the screw blades, causes the material to be removed from the central or internal portion of the mass which will cave the material M inwardly as indicated at $M_2$, which occurs along the entire length of the screw, thereby relieving the walls of any dynamic pressure build-up which would otherwise normally occur.

By relieving the lateral forces by minimizing the dynamic pressures on material discharge, the need for reinforcing the elevator walls 11 can be greatly reduced.

Figure 2:
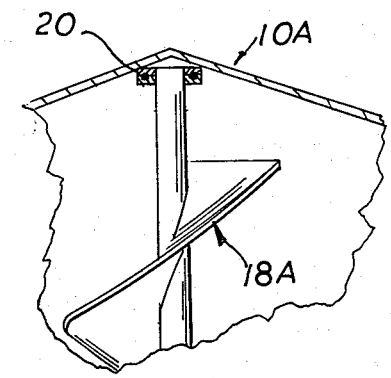
FIG. 2 is a fragmentary showing of a modified embodiment.

FIG. 2 illustrates a fragmentary portion of a storage elevator 19A in which the pressure relief device 18A is rotatably journalled in a suitable end bearing 20 for rotation. In the illustrated form, the screw 18A is mounted to idle, i.e., to rotate under the influence of the falling material adjacent the screw 18A when the discharge opening is opened. In all other respects the structure of FIG. 2 is similar to that hereinbefore described.

Figure 3:
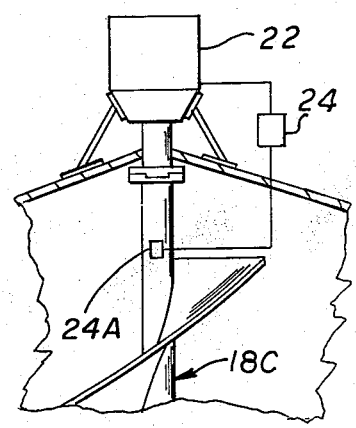
FIG. 3 is a fragmentary showing of another modified embodiment
Figure 1A:
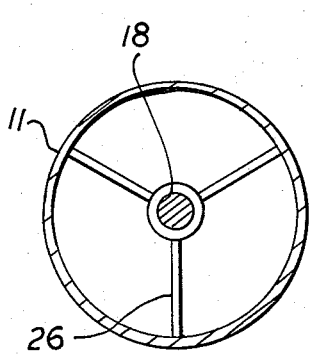
FIG. 1A is a section view taken along line 1A—1A on FIG. 1.

FIG. 3 illustrates another embodiment. In this arrangement, the screw 18C is rotatably mounted as described in FIG. 2, but differs therefrom in that the screw 18C is positively driven by a suitable power source, e.g., motor 22. The actuation of the motor 22 is timed to the opening of the discharge opening, so that the screw 18C rotates only when the discharge opening of the storage elevator 10C is opened. A means may be provided to control the speed of the screw 18C relative to the material resistance acting on the screw and rate of flow. This is attained by providing a suitable automatic speed controller 24 and sensing device 24a connected in circuit with the motor that will function to speed up or slow down the motor according to the resistance forces imposed on the screw and rate of flow during a discharging operation.

Figure 4:
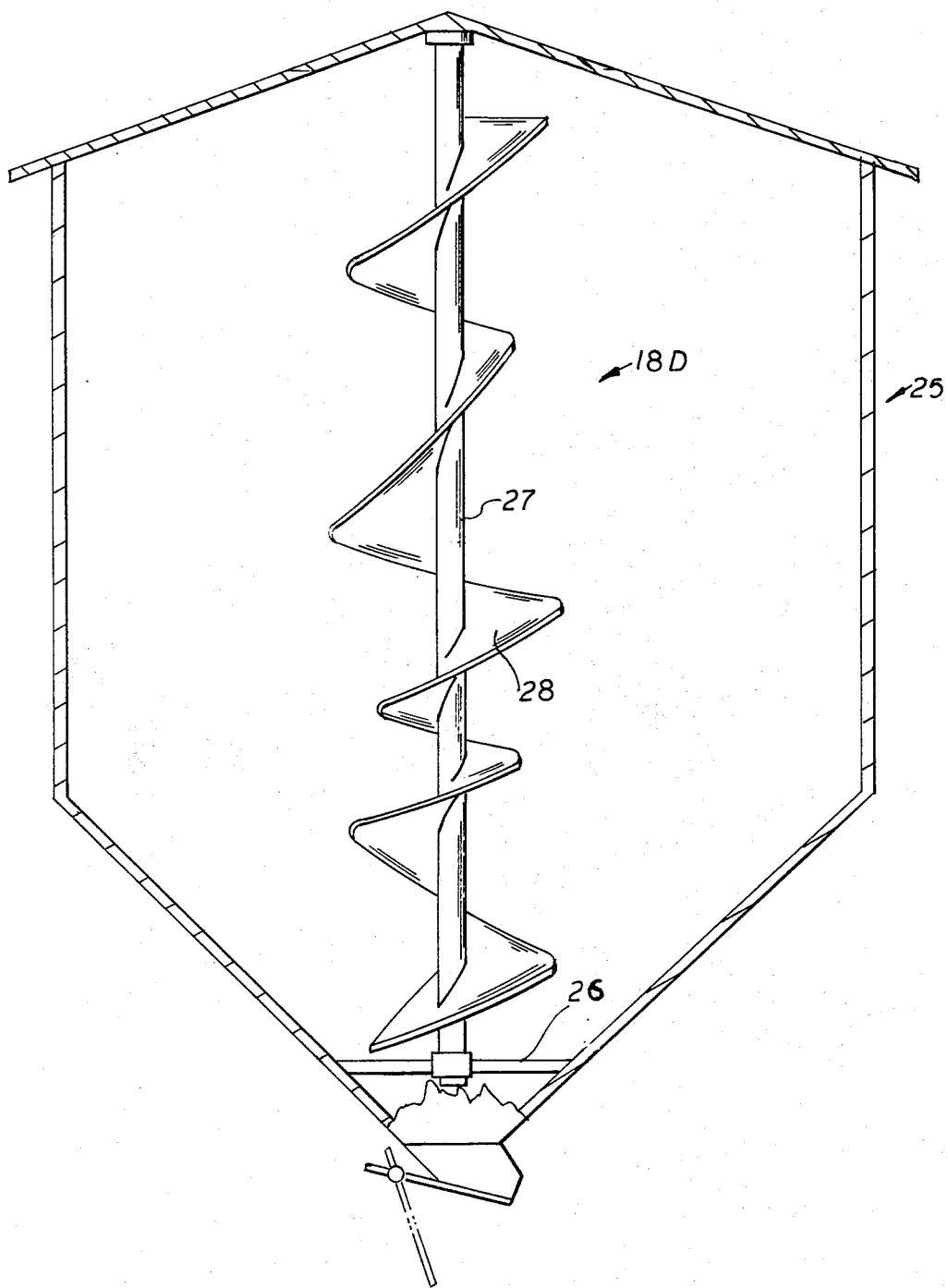
FIG. 4 is a sectional view of another modified form of the invention.

FIG. 4 illustrates another modified embodiment. In this form of the invention, the storage elevator 25 is provided with a pressure relief screw 18D which has a central axle 27 having a helical screw blade 28 in which the shape and pitch of the blades varies along the length of the axle 27. In all other respects the invention of FIG. 4 is similar to that hereinbefore described. It will be understood that the pressure relief screw 18D may be fixed, as herein described, or mounted for rotation to either idle or to be positively driven as described with respect to FIGS. 2 and 3.

In each of the described embodiments, the dynamic pressure build up on the elevator walls is substantially reduced. Also, the rate of discharge is enhanced since the dynamic pressure is relieved.

While the invention has been described with respect to several embodiments thereof, it will be appreciated and understood that variations and modifications may be made without departing from the spirit or scope of the invention.

What is claimed is:

1. A storage elevator building for storage grain or granular material comprising:
   an elongated storage bin having vertically extending circumscribing side walls in which a supply of said material is adapted to be stored,
   means defining a discharge opening disposed adjacent the lower end of the bin whereby said material is discharged therefrom,
   means defining a closure for said opening
   and a pressure relief means disposed in said bin for relieving the dynamic pressures exerted on the vertically extending side walls of the bin by the stored material during the discharge of said material thereby enabling said side walls to be sized to resist a loading which is less than the sum of the lateral forces normally acting on said side walls due to the static pressures imparted to said side walls by said stored material and the increase in said lateral forces due to the dynamic pressures otherwise imparted on said side walls in the absence of said pressure relief means by the flow of said material during discharge, and to enhance the flow of material during a discharge of said material through said opening,
   said pressure relief means comprising a screw which extends longitudinally along the interior of said bin in spaced relationship to said vertically extending side walls so that a rotational motion is imparted to the stored material during the discharge of said material, wherin said screw is fixedly disposed against rotation within the interior of said bin during discharge of said material.

2. A storage elevator building for storage grain or granular material comprising:
   an elongated storage bin having vertically extending circumscribing side walls in which a supply of said material is adapted to be stored,
   means defining a discharge opening disposed adjacent the lower end of the bin whereby said material is discharge therefrom,
   means defining a closure for said opening
   and a pressure relief means disposed in said bin for relieving the dynamic pressures exerted on the vertically extending side walls of the bin by the stored material during the discharge of said material thereby enabling said side walls to be sized to resist a loading which is less than the sum of the lateral forces normally acting on said side walls due to the static pressures imparted to said side walls by said stored material and the increase in said lateral forces due to the dynamic pressures otherwise imparted on said side walls in the absence of said pressure relief means by the flow of said material during discharge, and to enhance the flow of material during a discharge of said material through said opening,
   said pressure relief means comprising a screw which extends longitudinally along the interior of said bin in spaced relationship to said vertically extending side walls so that a rotational motion is imparted to the stored material during the discharge of said material, and including means for rotatably supporting said screw within said bin so that said screw is allowed to idle about its longitudinal axis upon discharge of said material.

3. The invention as defined in claim 2 and including a motor means connected to said screw to effect the positive drive thereof.

4. The invention as defined in claim 3 and including a torque controller connected in circuit with said motor means for varying the speed of the motor in accordance with the torque forces imposed on said screw.

5. A storage elevator building for storage grain or granular material comprising:
an elongated storage bin having vertically extending circumscribing side walls in which a supply of said material is adapted to be stored,
means defining a discharge opening disposed adjacent the lower end of the bin whereby said material is discharged therefrom,
means defining a closure for said opening
and a pressure relief means disposed in said bin for relieving the dynamic pressures exerted on the vertically extending side walls of the bin by the stored material during the discharge of said material thereby enabling said side walls to be sized to resist a loading which is less than the sum of the lateral forces normally acting on said side walls due to the static pressures imparted to said side walls by said stored material and the increase in said lateral forces due to the dynamic pressures otherwise imparted on said side walls in the absence of said pressure relief means by the flow of said material during discharge, and to enhance the flow of material during a discharge of said material through said opening,
said pressure relief means comprising a screw which extends longitudinally along the interior of said bin in spaced relationship to said vertically extending side walls so that a rotational motion is imparted to the stored material during the discharge of said material wherein the pitch of said screw varies along its axis.

6. A storage elevator building for storage grain or granular material comprising:
an elongated storage bin having vertically extending circumscribing side walls in which a supply of said material is adapted to be stored,
means defining a discharge opening disposed adjacent the lower end of the bin whereby said material is discharged therefrom,
means defining a closure for said opening
and a pressure relief means disposed in said bin for relieving the dynamic pressures exerted on the vertically extending side walls of the bin by the stored material during the discharge of said material thereby enabling said side walls to be sized to resist a loading which is less than the sum of the lateral forces normally acting on said side walls due to the static pressures imparted to said side walls by said stored material and the increase in said lateral forces due to the dynamic pressures otherwise imparted on said side walls in the absence of said pressure relief means by the flow of said material during discharge, and to enhance the flow of material during a discharge of said material through said opening,
said pressure relief means comprising a screw which extends longitudinally along the interior of said bin in spaced relationship to said vertically extending side walls so that a rotational motion is imparted to the stored material during the discharge of said material wherein both the pitch and diameter of the screw varies along its axis.

* * * * *